United States Patent [19]

Kobayashi et al.

[11] Patent Number: 4,914,688

[45] Date of Patent: Apr. 3, 1990

[54] MODEM SYSTEM

[75] Inventors: Tsunekazu Kobayashi, Kawasaki; Satoshi Sakuragi, Yokohama, both of Japan

[73] Assignee: Murata Mfg. Co., Ltd., Nagaokakyo, Japan

[21] Appl. No.: 236,895

[22] Filed: Aug. 26, 1988

[30] Foreign Application Priority Data

Sep. 1, 1987 [JP] Japan ................... 62-219651

[51] Int. Cl.[4] .......................................... H04M 11/00
[52] U.S. Cl. ...................................... 379/93; 379/97; 379/99; 375/8; 178/2 R
[58] Field of Search ................ 379/97, 98, 99, 93, 379/96; 375/8, 9; 178/2 R, 2 C

[56] References Cited

U.S. PATENT DOCUMENTS

| 4,440,987 | 4/1984 | Heep et al. | 375/9 |
| 4,637,035 | 1/1987 | Betts | 375/8 |
| 4,641,263 | 2/1987 | Perlman et al. | 375/8 |
| 4,682,352 | 7/1987 | Durham | 379/98 |

Primary Examiner—Jin F. Ng
Assistant Examiner—Wing F. Chan
Attorney, Agent, or Firm—William H. Pavitt, Jr.; Natan Epstein

[57] ABSTRACT

A modem system includes an RS232C interface; a modulator/demodulator; an input-output device having a parallel interface connected with a data terminal unit having no communication function or having a parallel specification; a parallel-to-serial converter for performing the mutual conversion between parallel data and serial data; a memory for temporally storing the transmitted or recieved data; and a controller for controlling the transmission and reception of data. The modem system can perform the convertion between RS232C specification data and centronix specification data such that a parallel specification printer or plotter having no communication function can be used as an output device for data transmitted to the modem system through the telephone network.

6 Claims, 6 Drawing Sheets

FIG. 8

MODEM SYSTEM

BACKGROUND OF THE INVENTION

1. Field of the Invention

The present invention relates to a modem system for making the reception and transmission of data between the general telephone network and particularly to a modem system including a communication control function therewith.

2. Description of the Prior Art

When communication between data terminal units is to be made through the telephone network, the latter is connected with each of the data terminal units through a modem system. Usually, the modem system comprises a modulator/demodulator and a standard protocol interface.

The modulator/demodulator is used to make the analog/digital conversion between digital data handled in the data terminal units and analog signals transferred through the telephone network. Digital data from the outputs of the data terminal units are transferred to the telephone network after they have been modulated into analog data. On the other hand, analog data from the telephone network are given to the data terminal units after the analog data have been demodulated into digital data.

The standard protocol interface is utilized to convert data forms different from one data terminal unit to another into a standard protocol. Such interface is normally in the form of RS232C interface. By the use of such interface, the standardized communication can be made between data terminal units having different specifications.

However, the conventional modem systems require that the data terminal units to be connected therewith has a communication control function. This results in a defect that any data terminal unit having no communication control function cannot be connected with the modem system.

Typical data terminal units without communication control function include printers, plotters and other instruments including word processors or personal computers without communication function. Such instruments having no communication control function cannot be coupled with the telephone network unless they are modified, since data are parallel-processed therein. For example, when a printer or plotter is to be connected with the telephone network to output data from a data terminal unit on the transmitter side at the printer or plotter, the data conversion must be performed through a parallel interface such as centronix interface or GPIB interface. However, the conventional modem systems do not have such a parallel interface. Thus, the conventional modem systems cannot independently control the printer, plotter or the like.

In recent years, it is increasingly required to perform data communication between terminal units of various different types. In such a case, even if there is used data terminal units without communication function or terminal units including parallel interfaces such as centronix interfaces, it is desired to simply connect the common telephone network with terminal units standardized with RS232C interfaces such that the communication between the terminal units can be made freely through the telephone network.

SUMMARY OF THE INVENTION

It is therefore an object of the present invention to provide an improved modem system comprising an RS232C interface and a modulator/demodulator, which can easily be connected with data terminal units having the conventional RS232C interfaces as well as terminal units operated through the other parallel interfaces or terminal units of printers, plotters and others having no communication function to perform the communication between the units.

To this end, the present invention provides a modem system having interface functions to both the RS232C and parallel (e.g. centronix) specifications, wherein data to be received and transmitted through the RS232C interface and/or data to be received and/or transmitted through the parallel interface can be transmitted between terminal units through the telephone network.

The modem system comprises an RS232C interface connected with data terminal units performing the reception and transmission of data and adapted to make a data conversion based on RS232C and a modulator/demodulator connected between the RS232C interface and the telephone network and adapted to make the modulation/demodulation between digital data handled in the data terminal units and analog data handled in the telephone network. Thus, there is performed a data communication according to RS232C in a manner similar to the prior art.

The modem system of the present invention further comprises an input-output (I/O) circuit connectable with a data terminal unit having no communication function and including a parallel interface for performing a data conversion and a parallel-to-serial converter connected with said modulator/demodulator and adapted to the mutual conversion between parallel data and serial data. When the modem system is connected with a data terminal unit without communication function or with parallel specification, for example, such as a printer or plotter, the necessary data conversion can be made within the modem system to produce serial data which can be supplied to the modulator/demodulator. Thus, data terminal units of various different types can be connected to one another in the mutual communication through the telephone network.

The modem system further comprises a controller for controlling the reception and transmission of data to process the RC232C and parallel data.

The modem of the present invention further comprises a memory for temporally storing data to eliminate any interference between the RS232C data and the parallel data, a gate signal generator for producing gate signals such as busy signals and others depending on the state of data, and an input-output (I/O) controller for controlling the gate signals to control said I/O circuit.

In such a manner, the modem system itself can perform the data communication based on the conventional RC232C. On the other hand, any necessary data conversion can be made within the modem system even for parallel data which could not be used for the communication. Thus, the data communication between the terminals can be performed through the telephone network.

In accordance with the present invention, the data communication will be carried out by the use of the telephone network in the following manner:

First of all, there is selected a mode in which the RS232C interface or centronix interface is utilized. The mode is set by supplying a set signal to the modem system through a keyboard in the data terminal. Alternatively, the setting of mode may manually be made through a mode setting switch included in the modem system.

When it is desired to perform the reception and transmission of data through a data terminal unit of RS232C specification via an RS232C interface, the RS232C interface and modulator/demodulator are first operated in the modem system according to the present invention as in the prior art. Data in the data terminal unit are subjected to the desired data conversion by the RS232C interface. At the same time, the modulator/demodulator performs the digital-to-analog conversion between digital signals from the data terminal unit and analog signals from the telephone network. As in the prior art, thus, data transmission is made through the telephone network.

When it is for the modem system of the present invention to perform data communication through the centronix interface, data from a data terminal unit having no communication function or RS232C specification are transmitted to the telephone network through the modem system of the present invention such that the data communication can be carried out through the telephone network. In the other words, the modem system of the present invention functions as a transmitter or receiver to enable the data communication under the centronix specification when an instrument to be connected with an external instrument is that data terminal unit. If this external instrument is an exclusively data receiving device such as a printer or plotter, the modem system will function to receive data from the telephone network and then to supply them to the printer or plotter.

The function of the present invention will be described in more detail. The modem system of the present invention executes the desired mode in accordance with a main program stored in ROM (read only memory). When a data terminal unit with centronix specification is connected with the modem system, the centronix interface contained in the modem system performs a conversion of parallel data which in turn are converted into serial signals through the parallel-to-serial converter. The data is thereafter connected with the telephone network through the modulator/demodulator as in the prior art.

The overall control is made through a controller located in CPU. Data can be temporally stored in the memory as desired, so that data can be read out from the memory at any moment.

When the modem system of the present invention serves to process data in centronix specification, the intricacy of data will be regulated by the use of an input-output controller and a gate signal generator. The input and output of data with centronix specification are controlled by the I/O circuit.

When the modem system of the present invention is utilized as a receiver, it transmits XON or XOFF signal to a transmitter through the telephone network so as to control the data transmission of that transmitter, depending on the state of the receiving data terminal unit connected with the modem system or the amount of data in the memory of the modem system. The XON signal permits the transmitter to transmit the data while the XOFF signal inhibits the data transmission of the transmitter. Thus, if the XOFF signal is provided to the transmitter, the data transmission thereof is inhibited and the transmitter is in its stand-by state until the process in the modem system of the present invention as the receiver is completed.

If the modem system of the present invention is used as a transmitter, it will receive XOFF or XON signal from a receiver in the same manner as described above. Depending on these gate signals, the modem system will judge the permission or inhibition of the data transmission.

The modem system of the present invention can be connected with a printer or plotter. For such a purpose, the main program stored in the ROM includes an answer printer mode. Therefore, the modem system can be used only as a receiver.

In the answer printer mode, the modem system is connected with the printer or plotter while another similar modem system constructed according to the present invention as a transmitter effectively acts in either of the centronix or RS232C interface specification. It is of course that if there is a delay in the process of the printer or plotter or an excessive reception of data beyond a given permissible limit in the answer printer mode, the modem system will provide a necessary gate signal, for example, XOFF signal to a transmitter through the telephone network.

In such a manner, the modem system of the present invention can perform the mutual communication through the telephone network, independently of the data specification of the data terminal unit thereof connected with any external instrument or without the communication function.

DETAILED DESCRIPTION OF PREFERRED EMBODIMENTS

The present invention will now be described in connection with one preferred embodiment thereof illustrated in the drawings.

Figure 1:
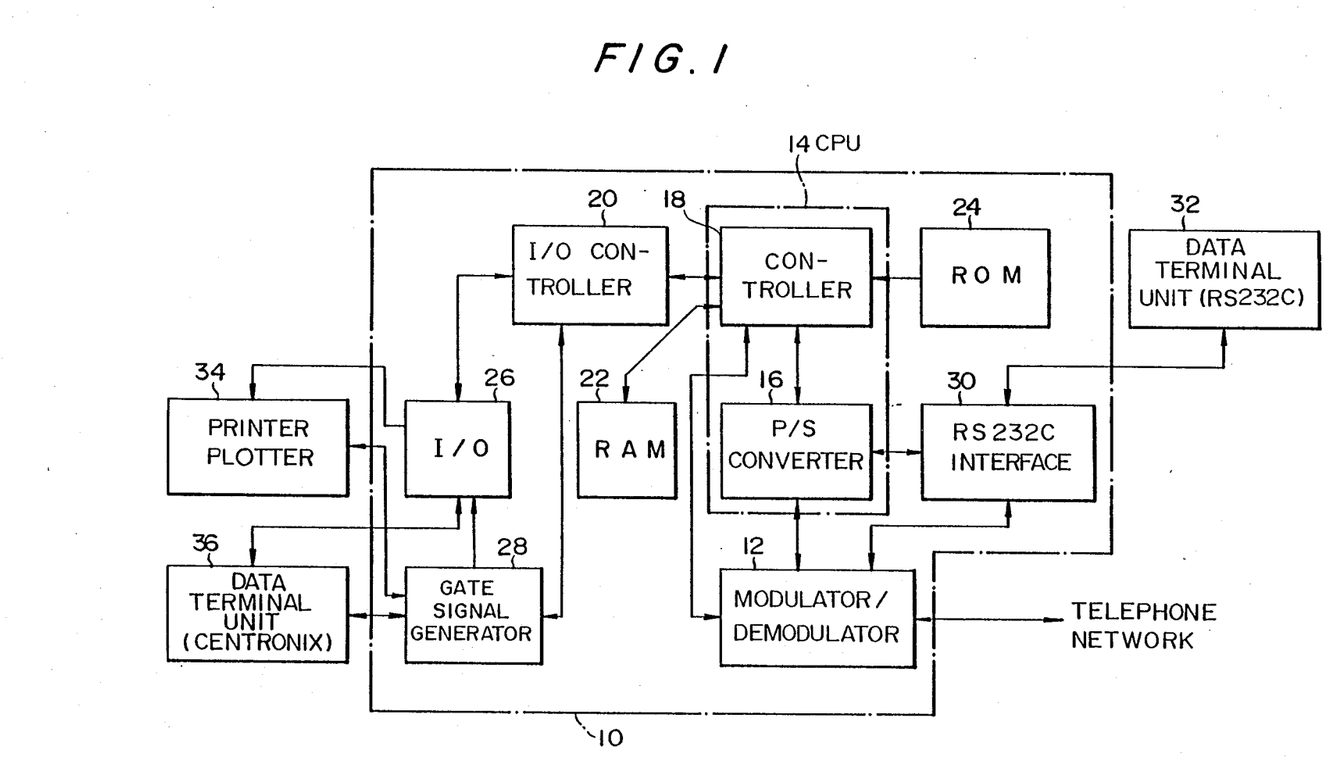
FIG. 1 is a block diagram of a modem system constructed in accordance with the present invention, the modem system being connected with the telephone network and an external instrument.

Referring to FIG. 1, there is shown the circuit diagram of a preferred embodiment of a modem system constructed in accordance with the present invention.

The modem system is connected with the telephone network, an RS232C data terminal unit, a centronix data terminal unit and a printer/plotter.

More particularly, the modem system 10 comprises an RS232C interface 30 and a modulator/demodulator 12. The RS232C interface is connected with a data terminal unit 32 having RS232C specification. The modulator/demodulator 12 is connected with the telephone network.

Therefore, the modem system can be used to perform the data communication between the data terminal unit and the telephone network for data under the conventional RS232C specification by the use of both the interface and the modulator/demodulator (30, 12).

As been well-known in the art, the modulator/demodulator 12 consists of a modulator and a demodulator which are adapted to make the analog-to-digital conversion between digital signals in the data terminal unit and analog signals in the telephone network. The modulator modulates digital signals and transfers the modulated signal to the telephone network while the demodulator receives analog data from the telephone network and converts them into digital data.

In one feature of the present invention, the modem system 10 comprises an input-output (I/O) circuit 26 including a centronix interface, which circuit 26 can be connected with a data terminal unit 36 having centronix specification and a printer/plotter 34.

The modem system 10 further comprises an input-output (I/O) controller 20 for controlling the I/O circuit 26 such that the intricacy of data to be processed in the modem system 10 can be regulated. The modem system further comprises a gate signal generator 28 for providing the desired gate signals to the I/O controller 20. The gate signal generator 28 permits the reception and transmission of busy signals between the data terminal unit 36 connected with the external instrument and the printer/plotter 34.

Since the modem system of the present invention can be connected with the data terminal unit 36 of the centronix specification or the printer/plotter 34 through the I/O circuit 26, the modem system will process parallel data under the centronix specification. The parallel data must be passed through the modulator/demodulator 12 before they are fed into the telephone network. Since the modulator/demodulator 12 is adapted to process serial signals, it is required that the modem system 10 includes a parallel-serial converter 16.

The modem system 10 further comprises a memory 22 for temporally storing data. In the illustrated embodiment, the memory 22 is in the form of RAM (random access memory).

The modem system 10 further comprises a controller 18 for controlling the I/O controller 20, memory 22, parallel-serial converter 16 and modulator/demodulator 12 or the RS232C interface, if required. The controller 18 is adapted to control the respective components in the desired mode, based on a program read out from an ROM 24. In the illustrated embodiment, the controller 18 and the parallel-serial converter 16 are contained within a CPU 14.

The modem system 10 shown in FIG. 1 will now be described in more details.

The parallel-serial converter 16 converts serial data from the modulator/demodulator 12 into parallel data which in turn are transferred to the memory 22 through the controller 18. The converter 16 also converts parallel data from the memory 22 or I/O circuit 26 into serial data which in turn are provided to the modulator/demodulator 12. Thus, the modem system 10 of the present invention can internally perform the conversion between the parallel data and the serial data.

The controller 18 regulates the intricacy of data. For such a purpose, the controller 18 receives, as gate signals, busy signals from the gate signal generator 28 through the I/O controller 20 or data overflow signals from the memory 22. If do so, the modem system outputs a signal XOFF inhibiting the data transmission to inform it to the transmitter that the receiver-side modem system cannot receive any further data. This inhibiting signal XOFF is supplied from the controller 18 to the telephone network through the modulator/demodulator 12 and then provided to the data terminal unit of the transmitter through the telephone network.

After the busy state has been disappeared and when a predetermined period of time elapses, the controller 18 produces a signal XON permitting the transmission of data at the output thereof. This permitting signal XON also is supplied from the modulator/demodulator 12 to the data terminal unit of the transmitter through the telephone network. Thus, the data terminal unit of the transmitter will be released from its stand-by state to initiate the transmission of data immediately as it receives the permitting signal XON.

On the contrary, when the modem system 10 is used as a transmitter, it will receive an inhibiting signal XOFF from the data terminal unit of a receiver depending on its busy state. The inhibiting signal XOFF is then received by the controller 18 through the modulator/demodulator 12 and converted therein into a busy signal which in turn is supplied to the I/O controller 20.

When the busy state in the receiver is disappeared, a signal XON permitting the transmission of data is supplied to the modem system 10 through the telephone network. The same permitting signal XON is provided through the modulator/demodulator 12 to the controller 18 wherein it is processed to disappear the busy signal.

The I/O controller 20 selects the input or output mode in the I/O circuit 26. In the input mode, parallel data (for example, eight-bit data) is taken out of the I/O circuit 26 and transferred to the memory 22 or modulator/demodulator 12 through the I/O controller 20. In the output mode, the I/O controller 20 provides parallel data (for example, eight-bit data) from the memory 22 to the I/O circuit 26 with a timing in respect to the terminal instrument connected with any external instrument. It is of course that the I/O controller 20 can inhibit the inputting or outputting operation in the I/O circuit 26 under the control of the controller 18, depending on the busy state in the printer/plotter 34 or the data terminal unit 36 which is connected with any external instrument.

Since the memory 22 is in the form of RAM as described, it temporally stores data from the parallel-serial converter 16 or I/O controller 20. The temporally stored data are sequentially read out from the memory under the control of the controller 18. Therefore, the memory 22 also serves as a buffer. If the modem system 10 receives a signal through the telephone network, for example, to execute an answer printer mode at the printer/plotter 34, the memory 22 can store and hold data received by the modem system until the controller 18 provides the transmission inhibiting signal XOFF to the transmitter through the telephone network depending on the busy state in the printer/plotter 34 such that the transmitter will be placed at its stand-by state.

The I/O circuit 26 itself includes a centronix interface and can be connected with the printer/plotter 34 or the data terminal unit 36 as described previously. Thus, the modem system can be utilized mainly together with a data terminal unit of parallel specification such as centronix specification or a printer/plotter having no communication function. Furthermore, the I/O circuit 26 can process parallel data, for example, such as eight-bit parallel signals. For such a purpose, the I/O circuit 26 substantially includes separate input and output circuits. The I/O circuit 26 is switched from the input mode to the output mode or vice versa by a switching signal from the I/O controller 20.

The gate signal generator 28 is adapted to provide a gate signal to the I/O controller 20 depending on the busy state in the centronix data terminal unit 36 and printer/plotter 34, and to supply busy signals from the I/O circuit 20 to various external instruments.

Figure 2:
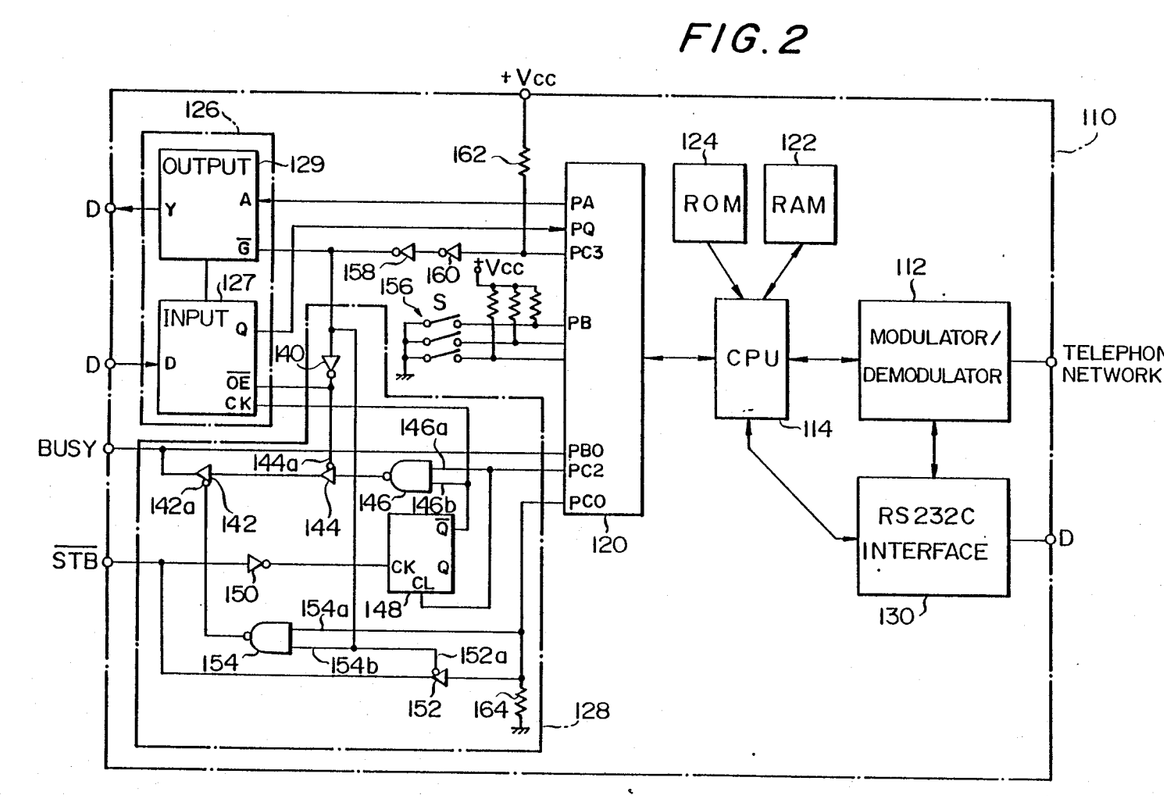
FIG. 2 is a block diagram showing the actual arrangement of a modem system constructed in accordance with the present invention.

FIG. 2 shows the further details of the modem system constructed in accordance with the present invention.

Referring to FIG. 2, there is shown a modulator/demodulator 112 of the well-known circuit arrangement. The modulator/demodulator 112 is connected with an RS232C interface 130 and a CPU 114 in the interior of a modem system 110. The modulator/demodulator 112 also is connected with the telephone network. Thus, the modulator/demodulator 112 can perform the conversion of digital signals from the RS232C interface 130 and also the conversion between digital signals from the CPU 114 and analog signals from the telephone network, as in the prior art.

The RS232C interface 130 has the same circuit arrangement as in the prior art and can be connected with an external RS232C data terminal unit. By the use of the RS232C interface 130 and modulator/demodulator 112, the modem system 110 of the present invention can perform the conventional data conversion under the RS232C specification.

The CPU 114 serves to supply a control signal to the modulator/demodulator 112 and RS232C interface 130 so that when the main program is placed in its RS232C communication mode, the CPU 114 can control the function of the RS232C interface and the function of the modulator/demodulator.

As in the first embodiment of the present invention shown in FIG. 1, the CPU 114 of FIG. 2 also comprises a controller and a parallel-serial converter. When the modem system 110 is functioning as a centronix interface, the CPU 114 executes the conversion between serial data from the modulator/demodulator 112 and parallel data from a memory 112 or I/O controller 120. In the embodiment illustrated in FIG. 2, the parallel data are in the form of eight-bit data, for example.

The CPU 114 further executes the main program stored in ROM 124 and sub-programs for RS232C communication mode, answer printer mode, originate printer mode, parallel command mode and other modes to provide necessary control signals to various components.

The CPU 114 further serves to regulate the intricacy of data in the modem system and to perform the fetching of busy signal, the necessary conversion of the busy signal into gate signal and the output of the busy signal, depending on the busy state in various instrument.

For example, if the centronix data terminal unit or printer/plotter connected with the external instrument is in its busy state, the CPU 114 will convert the busy signal from the I/O controller 120 into an inhibiting signal XOFF for data communication which in turn is transferred to the telephone network through the modulator/demodulator 112. Therefore, the modem system 110 will request the inhibition of data transmission to the transmitter since the centronix data terminal unit is in its busy state.

Similarly, if the memory 122 is in its overflow state, the CPU 114 provides the data transmission inhibiting signal XOFF to the transmitter to inhibit a further transmission of data.

It is of course that the CPU 114 can provide a permitting signal XON for data transmission to the transmitter to indicate the re-start of data transmission when the busy or overflow state is disappeared.

As described previously, the ROM 124 includes main program for controlling the modem system 110 and sub-programs for controlling various operational modes. If required, the CPU 114 will read out and execute these programs.

The I/O controller 120 includes a terminal PA used to supply eight-bit parallel data to the output circuit section 129 of the I/O circuit 126 and another terminal PQ utilized to receive eight-bit parallel data from the input circuit section 127 of the I/O circuit 126. Thus, the reception and transmission of data can be performed between the I/O controller 120 and the I/O circuit 126. The I/O controller 120 further includes control signal terminals PC0, PC2, PC3 and PBO through which the stored data are transferred from the memory 122 to the output circuit section 129 or through which the data from the input circuit section 127 can be provided to the CPU 114.

The I/O controller 120 further includes a mode setting terminal PB through which a group of manual switches 156 are connected with the controller 120. When the group of manual switches 156 are suitably actuated, the modem system 110 can be switched into the desired one of various operational modes.

As described previously, the I/O circuit 126 in this embodiment has separate input and output circuit sections 127, 129, each of which includes a centronix interface. Therefore, each of the input and output circuit sections 127, 129 can be connected with any external instrument such as a centronix data terminal unit or a printer/plotter having no communication function.

The terminal $\overline{G}$ of the output circuit section 129 is connected with the terminal PC3 of the I/O controller 120 through invertors 158 and 160. The terminal PC3 is in turn connected with a D.C. source VCC through a resistor 162. The terminal $\overline{G}$ is connected with the terminal $\overline{OE}$ of the input circuit section 127 through an invertor 140.

When the modem system 110 is switched on, the terminal PC3 is forced to become high level H. This causes the terminal G of the output circuit section 129 to become high level H and then inhibits the transmission of parallel data through the centronix interface.

At the same time, the terminal $\overline{OE}$ of the input circuit section 127 becomes low level L, so that the input of data can be performed for the input circuit section 127.

In other words, when the modem system 110 is switched on, the outputting operation of the output circuit 129 is inhibited such that the output circuit 129 which would usually be of low impedance can be protected.

The high level of the terminal PC3 of the I/O controller 120 is selected when the modem system 110 is switched from one mode to another. When the group of manual switches 156 is suitably actuated, the terminal PC3 can be changed to low level. At this time, the output circuit 129 will be placed in low level at the terminal $\overline{G}$ so that data can be sent out through the terminal $\overline{G}$. It is of course that the input of data is inhibited since the terminal $\overline{OE}$ of the input circuit 127 becomes high level under the above state.

As will be apparent from the foregoing, only one of the separate input and output circuit sections 127, 129 in the I/O circuit 126 can be usually placed operative.

The present invention utilizes a gate signal generator 128 for generating a gate signal which is used to inhibit or permit the transmission of signal depending on the busy state in the modem system connected with any external instrument. Such a gate signal generator 128 will be described below.

The gate signal generator 128 is located between the I/O controller 120 and an external instrument as described above. The I/O controller 120 includes a terminal PBO connected with the busy terminal of the centronix interface. This busy terminal also is connected with the output terminal of a first tri-state buffer 142 which has its input terminal connected with the output terminal of a second tri-state buffer 144. The input terminal of the second tri-state buffer 144 is coupled with the output terminal of a first NAND gate 146. The first NAND gate 146 includes a first input terminal 146a connected with the terminal PC2 of the I/O controller 120 and a second input terminal 146b connected with the terminal CK of the input circuit section 127 and also with the terminal $\overline{Q}$ of a flip flop 148. The terminal $\overline{OE}$ of the input circuit section 127 is coupled with the gate 144a of the tri-state buffer 144.

On the other hand, the terminal $\overline{STB}$ of the centronix interface is connected with the terminal CK of the flip flop 148 through a buffer 150 and also coupled with the output of a third tri-state buffer 152. The terminal CL of the flip flop 148 is connected with the terminal PC2 of the I/O controller 120. The terminal PC0 of the I/O controller 120 is coupled with the input terminal of the third tri-state buffer 152 and also with the first input terminal 154a of a second NAND gate 154. The terminal PC0 of the I/O controller 120 also is grounded through a resistor 164 such that the I/O controller 120 will be forced to be low level at the terminal PC0 when the modem system 110 is energized. In such a state, the terminal BUSY and $\overline{STB}$ are increased in impedance.

The second input terminal 154b of the second NAND gate 154 is coupled with the terminal $\overline{G}$ of the output circuit section 129 and also with the gate 152a of the third tri-state buffer 152. The output terminal of the NAND gate 154 is connected with the gate 142a of the first tri-state buffer 142.

The modem system having such an arrangement as shown in FIG. 2 will operate in the respective modes in the following modes.

In the same RS232C mode as in the prior art, the modem system 110 can perform only the data conversion by using the RS232C interface 130 and the modulator/demodulator 112. Therefore, the details of the operation are omitted. Rather, parallel data input and output modes will now be described below.

Figure 3:
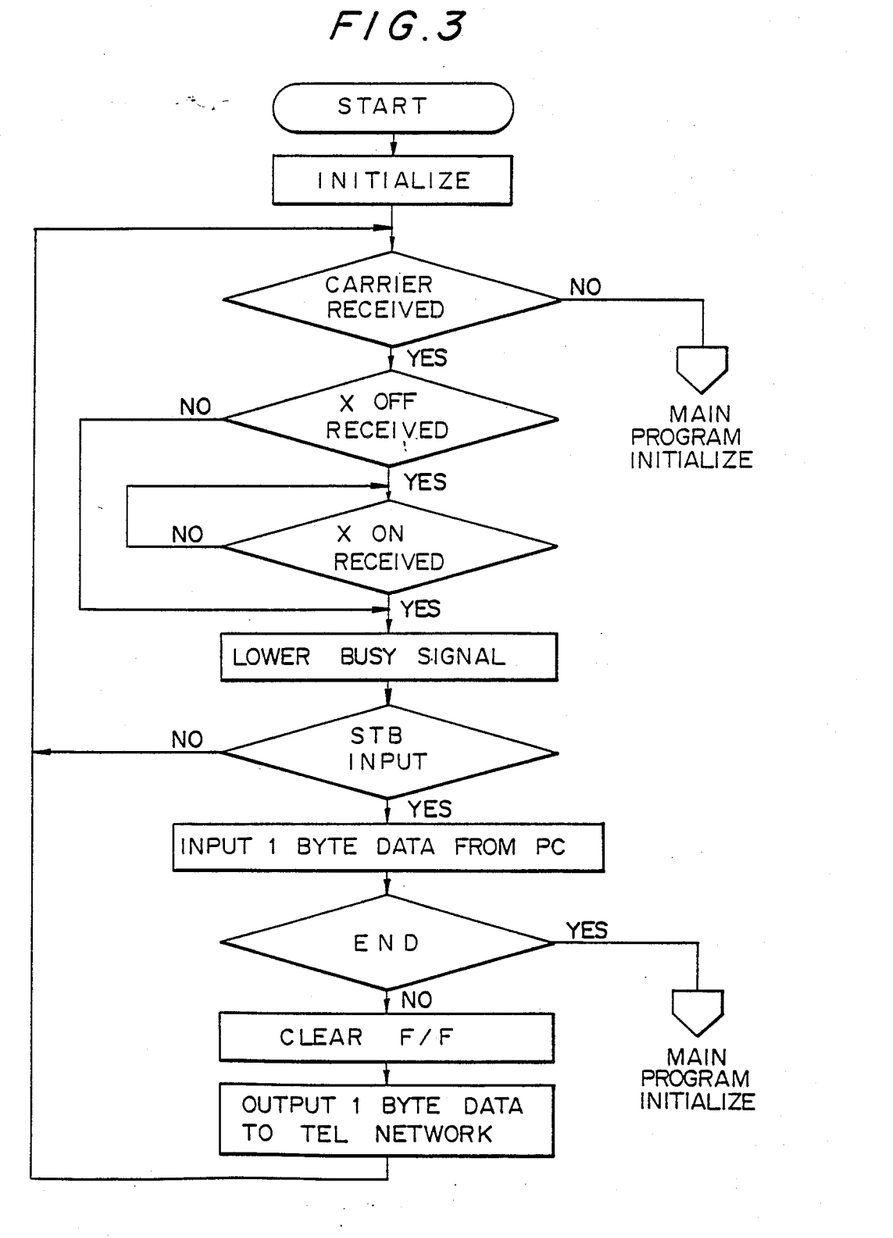
FIG. 3 is a flow chart illustrating the input mode of the modem system shown in FIG. 2 when it receives signals from a data terminal unit with a parallel specification and transfers the modified signals to the telephone network.

FIG. 3 shows the modem system 110 of the present invention in its input mode. The input mode is one that the modem system 110 receives parallel data from the centronix data terminal unit connected with any external instrument and then converts them into a perdetermined form with the converted data being sent to the telephone network.

When the power switch is turned on in the modem system, it becomes operative after a predetermined period of time and is subjected to initiarization.

In the illustrated embodiment, the modem 110 is connected with a parallel data terminal unit which is adapted to supply parallel data to the modem system 110. The modem system 110 also is coupled with an RS232C data terminal unit. By utilizing the keyboard of the RS232C data terminal unit, the modem system causes the CPU 114 to read a main program required in the input mode from ROM 124.

It is, of course, possible to manually operate the group of switches 156 so that the main program for the input mode is read in the CPU 114.

In such a manner, the CPU 114 can read the input mode (for example, originate printer mode) from the ROM 124 and placed in its program executable state.

At this time, the terminals PC3 and PC0 of the I/O controller 120 are in their high level, the input circuit 127 is in its operative state and the output circuit 129 is in its inhibit state, as described previously. Thus, the initialization of FIG. 3 is completed.

At this initialization, it is of course that the modem system 110 has been connected with a modem system to be in communication through the telephone network and placed on line such that the first mentioned modem system can receive data from the second mentioned modem system.

Next, it is judged whether or not the modulator/demodulator 112 receives a carrier from the telephone network. If the modulator/demodulator does not receive any carrier, the modem system returns to its switch-on state.

On the other hand, if the modulator/demodulator 112 receives a carrier, it is confirmed that there is a good connection between the two modem systems. If a transmission inhibiting signal XOFF is received by the transmitter-side modem system, it is judged that the receiver-side modem system is in its busy state. This means that the data terminal unit in the receiver-side modem system cannot receive any further data from the transmitter-side modem system for any reason such as busy state.

Figure 5:
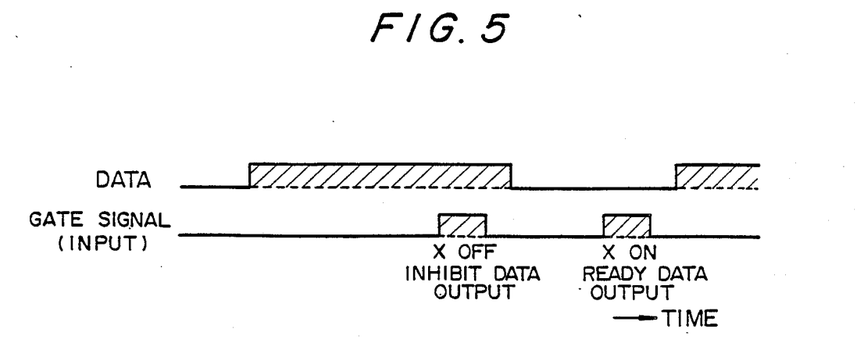
FIG. 5 is a timing chart illustrating the relationship between the transmitted data and gate signals in the input mode shown in FIG. 3.

FIG. 5 shows the relationship between data send from the modem system 110 and gate signals send from the other modem system. It will be apparent from this figure that if the modem system receives an inhibiting signal XOFF, it is placed in its data output inhibiting state. If a transmission permitting signal XON is then received by the modem system, it will be placed in its READY state for data output.

As the modem system is coupled with the telephone network and if the other modem system is placed in its receivable state, the I/O controller 120 provides a low-level busy signal to the centronix data terminal unit (shown by 36 in FIG. 1).

Figure 4:
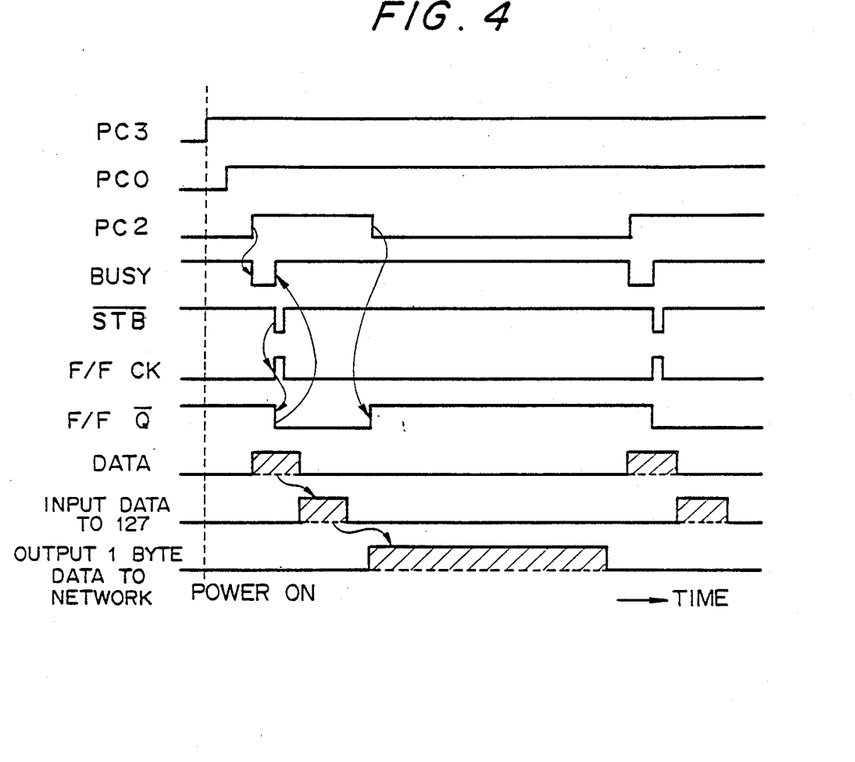
FIG. 4 is a timing chart illustrating the operation of FIG. 3.

As seen from FIG. 4, when the terminal PC2 of the I/O controller 120 becomes high level on command from the CPU 114, the busy terminal becomes low level since the terminal $\overline{Q}$ of the flip flop 148 is in its high level and both the control terminals 142a and 144a of the tri-state buffer 142 and 144 are in their low level. As described previously, the low-level busy signal will be provided to the data terminal unit connected with the external instrument.

The low-level busy signal permits the transmission of data, so that eight- or seven-bit parallel data will be send from the data terminal unit to the input circuit 127.

Such an input operation will be further described with reference to FIGS. 2 and 4.

When the busy signal becomes low level as described hereinbefore, a low-level signal STB is supplied from the data terminal unit connected with the external instrument to the terminal $\overline{STB}$. This signal STB is then provided to the terminal CK of the flip flop 148 through the invertor 150. As a result, the flip flop 148 is inverted such that the terminal $\overline{Q}$ thereof is brought into and held at its low level. This results in the inversion of the output of the NAND gate 146 to high level so that the busy signal at the busy terminal becomes high level.

Under such a situation, the parallel data will be provided by one byte from the external data terminal unit to the input circuit 127.

After the busy signal has been low level and if a signal STB is not provided to the terminal $\overline{STB}$, that is, when the terminal $\overline{Q}$ of the flip flop 148 is in its high level, it is again confirmed whether or not the modulator/demodulator 112 receives a carrier.

As one-byte parallel data has been inputted to the input circuit 127, it is then judged whether or not an END signal is inputted to the input circuit 127.

If the END signal is received by the input circuit 127, the modem system 110 is energized. On the other hand, if the END signal is not received by the input circuit 127, the CPU 114 produces, after a predetermined period of time, a command signal by which the terminal PC2 of the I/O controller 120 is placed low level.

As a result, the flip flop 148 is cleared with the terminal $\overline{Q}$ being placed high level. The input circuit 127 inhibits the input of data.

After the one-byte parallel data temporally stored in the memory 122 have been converted into serial signals by the parallel-serial converter in the CPU 114, they are again converted into analog signals by the modulator/demodulator 112 and thereafter transferred to the telephone network.

On completion of the above operation, the modem system 110 decides whether or not the modulator/demodulator 112 receives a carrier. In such a manner, the above cycle will be repeated.

Figure 7:
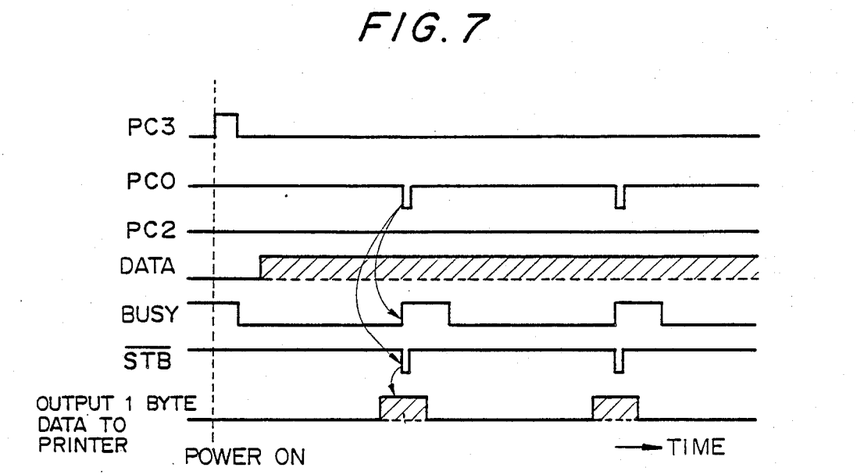
FIG. 7 is a timing chart illustrating the output mode shown in FIG. 6.
Figure 8:
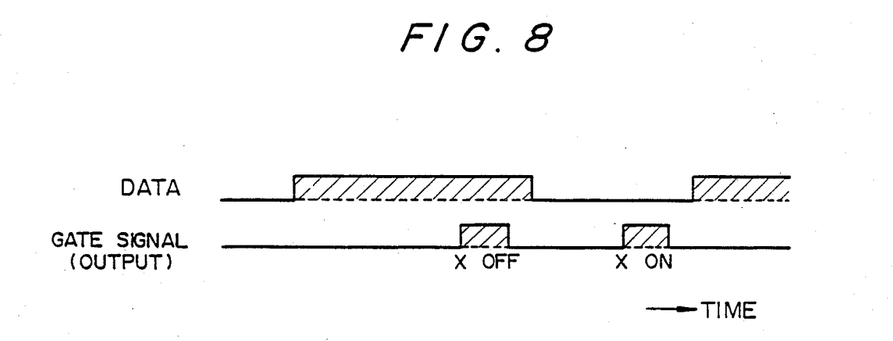
FIG. 8 is a timing chart illustrating the relationship between the data from the telephone network and gate signals in the output mode of FIG. 6.

The output mode of the modem system 110 will be described in connection with FIGS. 6, 7 and 8.

In the output mode, data from the telephone network is subjected to a conversion and then provided to an external data terminal unit, for example, to a printer/plotter. Such output mode is known, for example, as an answer printer mode.

The setting of the output mode can be made by manually actuating the aforementioned group of switches 156 or by providing a command from the keyboard of the RS232C data terminal unit through the RS232C interface after the modem system 110 has been energized.

In the output mode, the CPU 114 reads the output mode, for example, a main program in the answer printer mode from the ROM 124.

In the initial state, the terminal PC3 of the I/O controller 120 is in its high level while the terminal PC2 of the same is in its low level.

After started in the output mode, the modem system 110 executes the program to place the terminal PC3 at its low level.

This means that the centronix interface is switched from the input mode to the output mode. As a result, the input circuit section 127 of the I/O circuit 126 is placed at its inhibiting state while the output circuit section 129 of the same is placed at its READY state.

Under such a situation, it is of course that the modem system 110 has confirmed the state in the companion modem system and placed at its on-line state.

Figure 6:
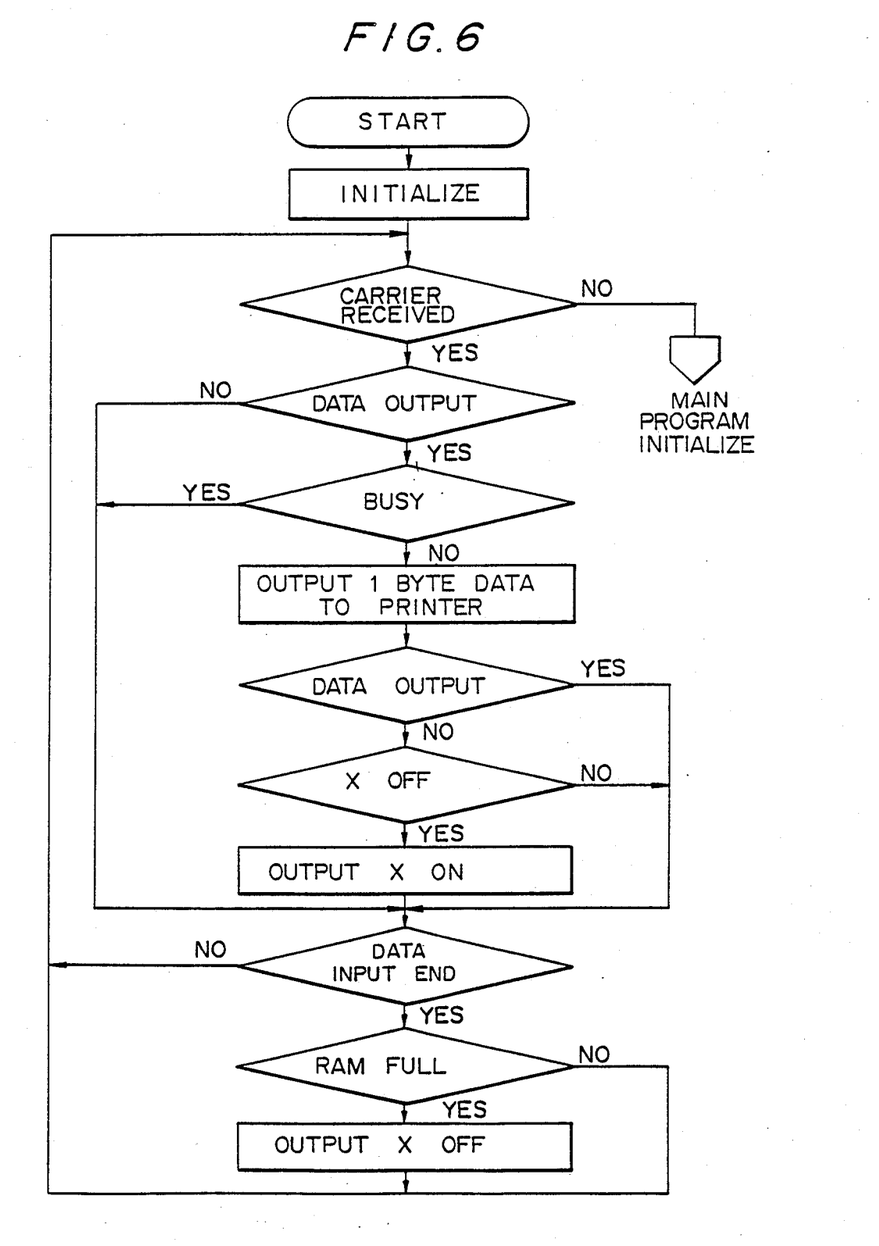
FIG. 6 is a flow chart illustrating the output mode of the modem system shown in FIG. 2 when it receives data from the telephone network and transfers the data to the parallel data terminal unit.

As in the input mode shown in FIG. 6, the modulator/demodulator 112 judges whether or not a carrier is received by the modem system. If not received, the modem system returns to its start state.

On the other hand, if the carrier is received by the modem system, it is decided by the CPU 114 whether or not any data to be outputted remain in the memory 122. If the data do not remain in the memory 122, it is then judged whether or not one-byte data have been inputted to the CPU 114 through the telephone network.

If the data remain in the memory 122, it is decided whether or not a busy signal has been provided to the I/O controller 120. If the busy signal has been provided to the controller 120, this means that the data terminal unit in the printer/plotter cannot process further data. Thus, the output of data from the I/O controller 120 will be inhibited. It is further confirmed whether or not one-byte serial data have been received by the CPU through the telephone network.

The busy signal is outputted from the printer or plotter when the mechanical printing speed in the printer or the mechanical drawing speed in the plotter is lower than the data sending speed in the memory 122. This prevents an overflow state from created.

If the busy signal has not been received by the I/O controller 120, the CPU 114 generates a command used to send a low-level signal from the terminal PC0 of the I/O controller 120 to the tri-state buffer 152. At this time, the gate 152a of the tri-state buffer 152 becomes low level since the terminal PC3 is in its low level. Therefore, a strobing signal will be outputted from the terminal $\overline{STB}$, that is, from an external instrument such as a printer.

As a result, the data stored in the memory 122 are provided by one byte from the output circuit 129 to the printer. At the same time, busy signals are send to the I/O controller 120 for a given period of time.

It is again confirmed whether or not the data to be outputted remain in the memory 122. If the data remain in the memory 122, it is decided that one-byte data have been read in the CPU 114 through the telephone network.

If the data do not remain in the memory 122, the modem system is placed in its data input wait state. It is therefore confirmed whether or not a busy signal is outputted from the printer and whether or not the modulator/demodulator 112 is providing a transmission inhibiting signal XOFF to the data terminal unit of the companion modem system.

If no inhibiting signal XOFF exists, it is confirmed whether or not one-byte serial data have been read in the CPU 114. If the inhibiting signal XOFF is being outputted, a permitting signal XON is immediately outputted from the CPU 114 to place the modem system at its data input permitting state, as shown in FIG. 8.

If one-byte serial data have not been inputted from the data terminal unit of the companion modem system to the CPU 114, it is then confirmed whether or not the modulator/demodulator 112 receives a carrier.

If one-byte serial data have been provided to the CPU 114, it is confirmed whether or not the memory 122 is in its readable state. If the memory 122 is in its readable state, it is then confirmed that the modulator/demodulator 112 has received a carrier.

On the other hand, if the memory 122 is not readable, an inhibiting signal XOFF is send from the modulator/demodulator 112 to the companion modem system to prevent further transmission of data.

In such a manner, the reception of carrier at the modulator/demodulator 112 is confirmed and such a cycle will be repeated. In accordance with the present invention, the modem system itself can perform the same RS232C interface process as in the prior art and also the parallel interface process. The communication can be carried out between various instruments through the telephone network.

Thus, the present invention provides the following advantages:

1. The receiver-side modem system itself can actuate any external instrument such as printer or plotter without processing data from the data terminal unit of the transmitter-side modem system through the telephone network by the provision of a data terminal unit in the receiver-side modem system. Thus, the modem system can utilize the printer or plotter having no communication function as an output device without any modification.

2. The modem system of the present invention can freely make a communication between the RS232C interface and the parallel interface such as centronix interface. Thus, the transfer of data can be carried out between different types of instruments.

We claim:

1. In a modem system of the type having an RS232C interface and a modulator/demodulator connected for converting digital data in serial RS232C format to analog signals transmissble over the telephone network, the improvement comprising:
    an input-output circuit for connection to the parallel data port of an external data handling device;
    converter means connected between said input-output circuit and said modulator/demodulator for bi-directionally converting between parallel and serial data format;
    controller means for controlling the flow of data between said modulator/demodulator and said input-output circuit; and
    means for selecting an operating mode whereby said modulator/demodulator is operatively connected to either said RS232C interface or said bi-directional serial-to-parallel converter means;
    whereby bi-directional communication is selectable between the telephone network and either the RS232C interface or the parallel port.

2. The system of claim 1, the improvement further comprising:
    an input-output controller for controlling the transmission and reception of data to and from said input-output circuit;
    a buffer memory for temporarily storing digital data received from either said modulator/demodulator or said input-output circuit; and
    a gate signal generator operatively connected with said input-output controller for applying a busy signal at said input-output circuit as required by the state of the external data handling device;
    said controller means providing control signals to said input-output controller, modulator/demodulator and converter means to control the flow of data between said modulator/demodulator and said input-output circuit depending on the quantity of data stored in said memory.

3. A modem system as defined in claim 2 further comprising read-only-memory means associated with said controller means for storing a plurality of main programs corresponding to different modes of operation and adapted to control said input-output controller, modulator/demodulator and converter means in accordance with the selected program corresponding to a selected mode.

4. A modem system as defined in claim 3 wherein the selection of mode is performed by operating a group of switches associated with said input-output controller.

5. A modem system as defined in claim 2 wherein said input-output circuit is divided into an output circuit section and an input circuit section and upon system initialization as by first application of power, the input-output controller places said input circuit section in a READY state and said output section in an INHIBITED state.

6. A modem system as defined in any one of claims 1 through 12 wherein said gate signal generator includes a plurality of gates connected with said input-output controller and input-output circuit and a flip-flop and said gate signal generator further includes busy and strobe terminals for connection to the parallel port of said external data handling device.

* * * * *